March 21, 1967 A. R. SEGAL 3,309,756
CIRCULAR SAW
Filed Oct. 30, 1964 2 Sheets-Sheet 1

INVENTOR
Arthur R. Segal
BY
ATTORNEY

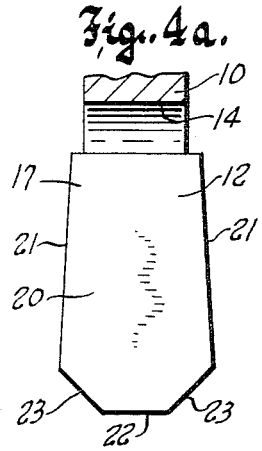
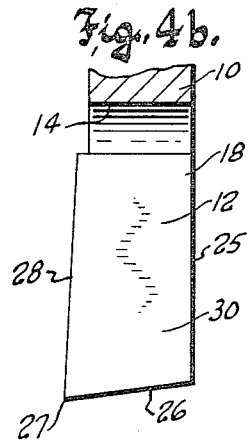
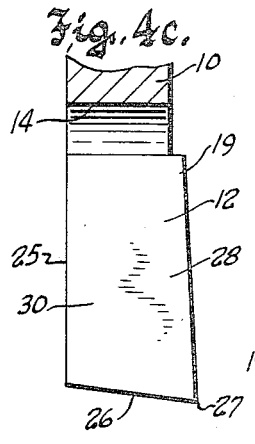
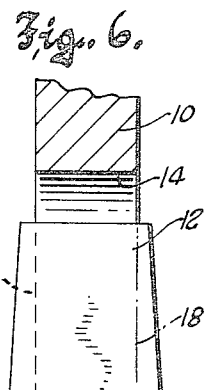
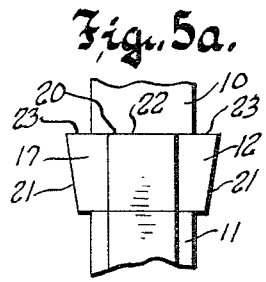
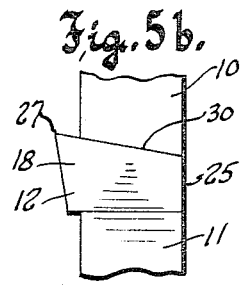
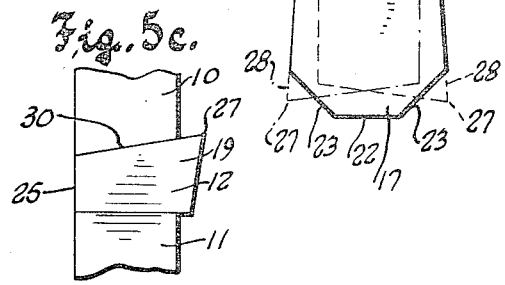
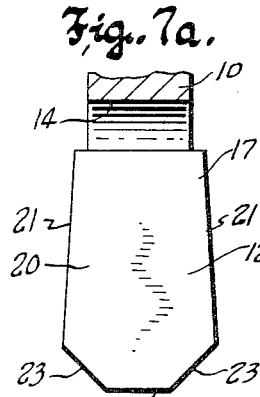
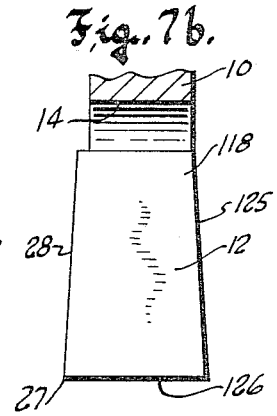
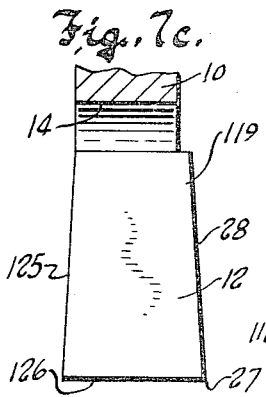
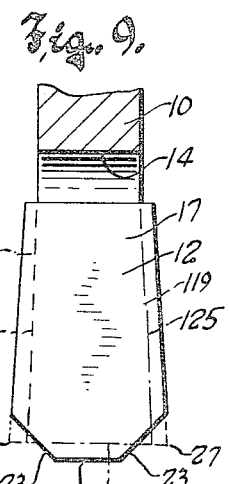
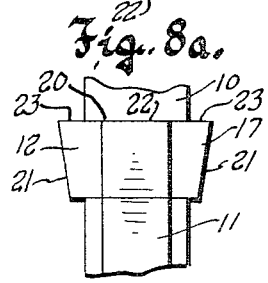
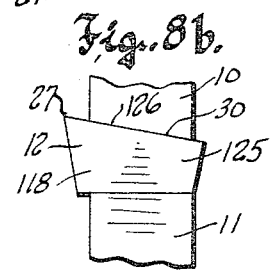
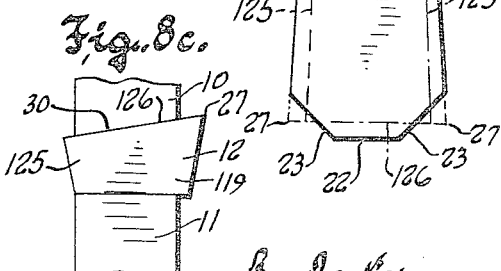

United States Patent Office 3,309,756
Patented Mar. 21, 1967

3,309,756
CIRCULAR SAW
Arthur R. Segal, Jasper, Ind., assignor to North American Products Corp., Jasper, Ind., a corporation of Wisconsin
Filed Oct. 30, 1964, Ser. No. 407,829
1 Claim. (Cl. 29—95)

This invention relates to cutting tools and has more particular reference to improvements in circular saws, and especially those of the type having carbide faced teeth.

As will appear hereinafter, a circular saw is but one example of a tooth cutting tool to which this invention is applicable, it being understood that the principles of the invention can be incorporated in a variety of tools having teeth designed to perform various slotting, grooving, forming, machining and/or shaping operations.

In general, it is the object of this invention to provide a cutting tool such as a circular saw, which will readily and smoothly cut certain materials that were formerly exceedingly difficult or even impossible to machine without chipping or tearing, or becoming gummy from heat generated during cutting.

Several plastic materials present these problems during sawing, and it was not at all unusual for large and costly sheets of thick transparent plastic material such as is used for doors and the like to be so badly chipped and torn during sawing to the desired size as to render the resulting panel unusuable. In cases where the heat generated during cutting caused the plastic material to become gummy, smooth cutting was impossible and extra machining on the sawed edges was usually necessary.

In a more specific sense, it is an object of this invention to provide a circular saw or similar toothed tool with so called combination teeth that are designed to effect cutting in a plurality of different ways, and so that each of a group of at least three circumferentially adjacent teeth can act upon only limited amounts of the material being cut by the saw to achieve an exceptionally smooth cutting action.

This objective is achieved primarily through the provision of teeth that are arranged in groups each having a lead or roughing tooth and a plurality of shorter finishing teeth following the lead tooth. Hence, the lead teeth determine the depth of the kerf cut by the tool, but they are designed to act only upon limited areas at the bottom of the kerf that are spaced from its opposite sides. Each finishing tooth is designed to act only upon a limited amount of material left at one side of the kerf after the cut made by its lead tooth, and the finishing teeth of each group cut to less depth than their lead tooth and collectively define the width of the kerf cut by the tool.

More specifically, it is a purpose of this invention to provide a circular saw or other tool with teeth embodying such combinations of rake angle, face shear angles and bevels on the tips of the carbide facings as to achieve cutting in a way that relieves those stresses that heretofore caused chipping, tearing and binding during cutting, and to also assure that the reaction forces will be translated into compression loading of the teeth rather than shear and tensile strains that heretofore tended to fracture the braze bonds holding the carbide facings on the teeth and even shear off the teeth backing the facings in cases of severe binding or shock.

Still another object of this invention resides in the provision of a cutting tool having teeth of the character described, wherein the carbide tooth facings are set at such a shallow or negative rake angle as to achieve unusually good support therefor along their cutting edges to thus assure retention of sharpness and longer tool life.

A further object of this invention resides in the provision of a cutting tool having teeth of the character described, wherein the finishing teeth cut with a positive and easy side shearing action which offsets the higher cutting pressures resulting from the shallow or negative rake angle of the teeth, and in addition can be beveled at their tips to reduce penetration pressure to such an extent as to minimize the danger of chipping brittle material on the leaving edge of the cut.

Another object of this invention resides in the provision of a tool of the character described having finishing teeth that assure a free running chip action away from the sides of the kerf cut thereby, so as to relieve chip drag and compression and assure cool, clean and smooth cutting of low melting point high polish transparent materials.

With the above and other objects in view which will appear as the description proceeds, this invention resides in the novel construction, combination and arrangement of parts substantially as hereinafter described and more particularly defined by the appended claim, it being understood that such changes in the precise embodiments of the hereindisclosed invention may be made as come within the scope of the claim.

The accompanying drawings illustrate several complete examples of the physical embodiments of the invention, constructed according to the best modes so far devised for the practical application of the principles thereof, and in which:

FIGURES 4a, 4b and 4c are enlarged face views of each of a group of three circumferentially adjacent teeth showing the different cutting edges thereon;

FIGURES 5a, 5b and 5c are end views of the teeth seen in FIGURES 4a, 4b and 4c, respectively;

FIGURE 6 is an enlarged composite view of the teeth seen in FIGURES 4a, 4b and 4c;

FIGURES 7a, 7b and 7c are views similar to FIGURES 4a, 4b and 4c but showing teeth of slightly modified form;

Figure 1:
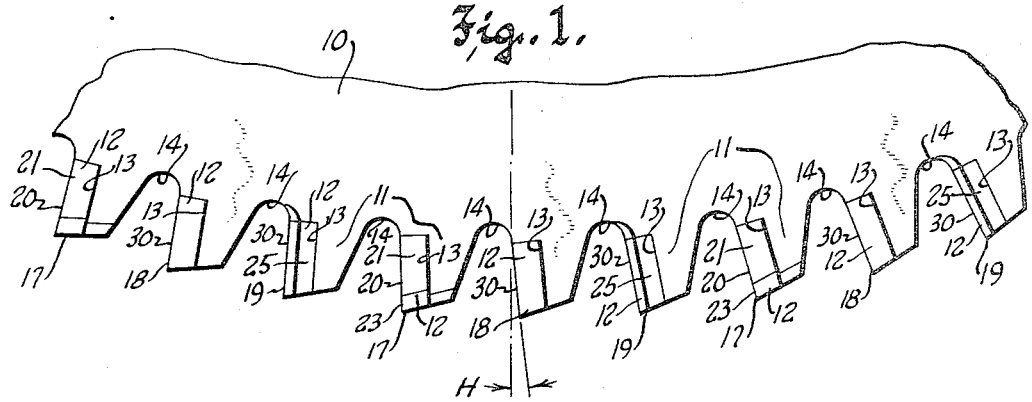
FIGURE 1 is a side elevational view of a portion of a circular saw embodying this invention.
Figure 2:
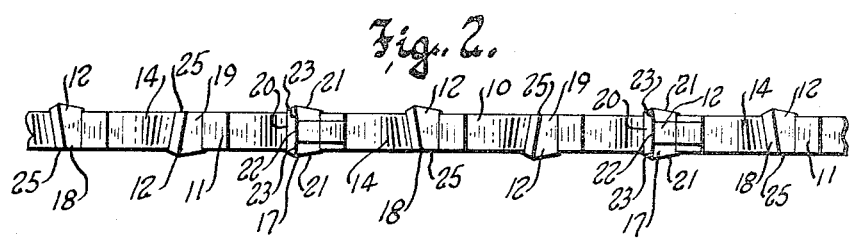
FIGURE 2 is an edge view thereof at an enlarged scale.

FIGURES 8a, 8b and 8c are end views of the teeth seen in FIGURES 7a, 7b and 7c, respectively; and FIGURE 9 is an enlarged composite view of the teeth seen in FIGURES 7a, 7b and 7c.

Referring now to the accompanying drawings wherein like reference characters identify like parts throughout the views, the numeral 10 designates the body of a cutting tool, here shown by way of example as a circular saw. The body 10 of the saw is in the form of a flat steel disc, only a portion of which is shown, having circumferentially equispaced teeth 11 formed on its periphery. The teeth are provided with tungsten carbide cutting tips or facings 12 which, in the present case, are set in notches 13 in the teeth which open forwardly thereof outwardly of formed gullets 14 at the roots of the teeth. The carbide tips or facings 12 are bonded, as by brazing, to the fronts of the teeth 11, and disposed so as to be tangent to the curve of the gullets and thereby merge smoothly thereinto.

It will be understood, of course, that it is immaterial to this invention whether or not formed gullets are provided between the teeth 11, and that in either event, a so called locked in construction may be employed, wherein the inner end portions of the carbide facings 12 are received in deeper notches that extend radially inwardly beyond the gullets.

The teeth have been shown with a negative rake or hook angle, designated H in FIGURE 1. While this angle is preferably on the order of about 5°, it may vary somewhat from a slightly positive rake angle to zero or even to a larger negative angle, depending upon the characteristics of the material to be cut, the equipment used, or the conditions to be satisfied.

According to this inventon, the saw teeth are arranged in groups each comprising three adjacent teeth, namely an end cutting lead tooth 17, and a pair of side cutting finishing teeth 18 and 19 following the lead tooth.

The lead teeth are slightly longer than the finishing teeth, and thus cut to a greater depth than the finishing teeth. Their faces 20 lie in planes normal to the flat sides of the saw body 10, and their opposite sides 21 project from the sides of the body and are ground to have both radial and side clearance. In other words, the opposite sides of the lead teeth converge inwardly toward the heel of the facings and rearwardly toward their brazed joints with the saw teeth.

At its outer end, each lead tooth 17 has a square cutting edge 22 lying in the plane of its face 20, and abruptly angled corner cutting edges 23 flanking the edge 22 and defined by beveling the corner junctions between the sides and tips of the teeth. Hence, the lead teeth may be said to have outer end portions which converge from the widest areas of the teeth toward their square cutting edges 22.

Each of the shorter side cutting finishing teeth 18 and 19 has a non-cutting side 25 which can lie in the plane of the adjacent side of the saw body. As seen best in FIGURES 4b and 4c, the non-cutting side of the first finishing tooth 18 following the lead tooth 17 is disposed at one side of the saw body, while the non-cutting side of the second finishing tooth 19 is disposed at the opposite side of the body. The entire tip or outer end of each finishing tooth is preferably beveled as at 26, inwardly toward the non-cutting side 25 of the tooth, to define a corner cutting edge 27 at the cutting side 28 of the tooth. Like the sides 21 of the lead teeth, the cutting sides 28 of the finishing teeth also overhang the adjacent side of the saw body and are ground with side and radial clearance. Hence, the corner cutting edges 27 are defined by the junctions of their faces 30 with their surfaces 26–28, and the latter surfaces are at an angle of considerably less than 90° to one another.

Referring now to FIGURE 6, which is a composite face view of the lead tooth 17 and the two finishing teeth 18 and 19 following the same, it will be seen that the corner cutting edges 27 of the finishing teeth 18 and 19 are adapted to travel in orbits lying outwardly of the angled edges 23 of their lead tooth 17 but slightly inwardly of the orbit of travel of the square cutting edge 22 on the lead tooth. Also, the extremities of the corner cutting edges 27 on the finishing teeth lie in planes parallel to and equidistant from the median plane of the saw body, while the widest portions of the lead tooth are disposed inwardly of said planes. This latter condition can be assured if the finishing teeth have their cutting sides coincident with those of the lead tooth, as shown in FIGURE 6.

From the above, it will be seen that the corner cutting edges of the finishing teeth 18–19 determine the width of the kerf cut by the teeth during use of the tool, while the lead teeth 17 determine the depth of the kerf cut by the tool. It will also be appreciated that during cutting, no more than about the outer one-half of the convergent ends of the lead teeth will act upon the material being cut, so that the lead teeth cut a limited amount of the material and rough out a groove therein which has less width than the finished cut made at the sides of the kerf by the finishing teeth following the lead teeth. Consequently, the corner cutting edges 27 of the finishing teeth act only upon relatively small amounts of material in the kerf left by the angled cutting edges 23 on the convergent outer ends of the lead teeth, and are thus able to make an exceptionally easy, clean and smooth side cut. The effectiveness of the cutting action achieved by the finishing teeth 18 and 19 is materially enhanced by the fact that their faces 30, while being disposed at a negative rake angle as mentioned heretofore, are also slanted rearwardly toward the non-cutting sides 25 of the teeth as shown best in FIGURES 5b and 5c, thereby giving the finishing teeth a pronounced positive face shear angle. The alternate positive shear angles on the finishing teeth is highly beneficial since it produces a free running chip flow away from the sides of the kerf and into the open space or groove cut by their lead tooth. This relieves chip drag and compression, enables cutting to be performed with a minimum of heating, and prevents marring of surface finish on the sides of the kerf, which can be an important consideration when cutting soft, high polish and transparent materials.

Figure 3:
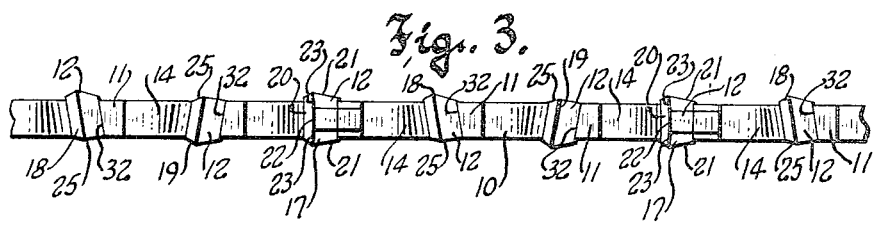
FIGURE 3 is a view similar to FIGURE 2 but showing a slightly modified form of the invention.

The positive face shear angles can be achieved by grinding the faces 30 of the carbide facings on the finishing teeth, as would be necessary when the notches 13 in which they are secured have surfaces which lie in planes normal to the body of the saw. However, if the notches for the finishing teeth are machined in the steel backing teeth 11 to define angled seats such as seen at 32 in FIGURE 3, namely at an angle corresponding to the desired face shear angle on the facings of their finishing teeth, carbide facings of uniform thickness measured circumferentially of the saw body, when brazed to such angled seats, will automatically have their faces at the proper positive shear angle and will not require grinding to achieve the same.

FIGURES 7a, 7b and 7c and their companion views, FIGURES 8a, 8b and 8c illustrate a group of carbide faced teeth comprising a lead tooth 17 and a pair of finishing teeth 118 and 119 following the lead tooth. The facing on the lead tooth can be identical to that shown in FIGURES 4a and 5a, but the facings on the alternate side cutting finishing teeth 118 and 119 are of slightly modified shape. The non-cutting sides 125 of the finishing teeth facings are again at opposite sides of the saw body 10, and while they are flush with the adjacent side of the body at their heels, they slant outwardly slightly toward the outer end of the tooth but at an angle considerably less than that on the cutting sides 28 of the facings. In addition, their outer ends 126 have been shown as substantially square or normal to the sides of the saw body. It should be borne in mind, however, that even though the outer ends or tips of the finishing teeth 118–119 are not ground with a bevel such as seen at 26 in FIGURES 4b and 4c, their edges 126 will inherently have a slight taper, inwardly away from the cutting corners 27 on the teeth, due to the combination of positive face shear angles and circumferential relief on the outer ends of the saw teeth.

In all cases, however, the carbide facings on the finishing teeth will be ground to provide them with a suitable amount of radial and side clearance at their cutting sides. The facings on the lead teeth may also be ground with the same radial and side clearance at their opposite flanks, although this is not essential since they never cut to a depth corresponding to their maximum face width.

The corner angles or bevels 23 on the outer ends of the lead teeth 17 are usually 45°, but these angles may be either more or less than 45° to accommodate chip or feed rate conditions. Similarly, the width of the cutting edge 22 on the lead teeth may be made either greater or smaller to meet cutting requirements for various materials.

Normally, the drop, or difference in diametral dimensions between the lead and finishing teeth, referred to previously as their difference in length, may be from about .014″ to .030″, but it can be as much as 1/32″ on the radius, depending upon the amount of finish stock to be removed by the finishing teeth.

Variation of the angle of the tip bevel 26 on the tips of the finishing teeth can provide for control of penetration needed for any particular materials. This angle can be as much as 25°, or even more, depending upon the material to be cut. As mentioned heretofore, the positive face shear angle in combination with the circumferential relief on the tips of the teeth will inherently provide a degree of bevel on the tips of the finishing teeth that may be adequate for certain materials to be cut.

Although each group of teeth has been shown and described as comprising a lead tooth and a pair of finishing teeth following the lead tooth, this invention obviously applies as well to different groupings of teeth as long as each group incorporates at least one lead tooth and at least two finishing teeth. For example, it might be advantageous for proper cutting of certain materials to double the number of finishing teeth in each group of teeth. In that case, each pair of finishing teeth could be ground to cut stepwise at one side of the kerf so as to reduce the size of the chip cut by each finishing tooth.

From the foregoing description, together with the accompanying drawings, it will be apparent that this invention provides a cutting tool which is particularly well suited for the cutting of either brittle or soft materials, such as plastics or the like, without damaging or marring the finished edge cut by the tool.

What is claimed as my invention is:

A cutting tool having a body with a cutting edge portion, and having spaced teeth which project outwardly from said cutting edge portion and laterally to its opposite sides, said teeth having cutting edges at the junctions between their faces and tip portions and being further characterized by the following:

A. the faces of all the teeth being disposed at a rake angle which is between slightly positive and slightly negative;
B. the teeth being arranged in groups each comprising a lead tooth and a pair of finishing teeth following the lead tooth;
C. each finishing tooth having cutting and non-cutting corners at opposite sides of its tip portion,
 (1) each cutting corner comprising cutting edges at the tip and one side of its finishing tooth, which cutting edges are disposed at an angle of less than 90° to one another,
 (2) the cutting corners on the two finishing teeth of each group being disposed at opposite sides of said cutting edge portion and having sharp apexes which are adapted to travel in orbits spaced equal distances laterally to opposite sides of said cutting edge portion and define the width of the kerf cut by the tool,
 (3) and the finishing teeth of each group having their faces disposed at positive but opposite and equal shear angles;
D. and each lead tooth having sides which project equal distances laterally to opposite sides of said cutting edge portion of the tool, beyond the orbits of the non-cutting sides of the finishing teeth but within the orbits of the apexes of the cutting corners on the finishing teeth, each lead tooth further having
 (1) a neutral face shear angle,
 (2) opposite sides which are convergent at the tip portion of the tooth,
 (3) and a square cutting edge at its tip at which the convergent sides of the tooth terminate.

References Cited by the Examiner

UNITED STATES PATENTS

| | | | |
|---|---|---|---|
| D. 32,820 | 6/1900 | Zwiebel. | |
| 336,380 | 2/1886 | Bertram | 143—133 |
| 543,608 | 7/1895 | Beale | 29—103 |
| 754,134 | 3/1904 | Granberg | 143—140 |
| 1,240,939 | 9/1917 | Carlson | 143—133 |
| 2,600,272 | 6/1952 | Segal | 143—133 |
| 2,637,355 | 5/1953 | Chapin | 143—133 |
| 2,770,267 | 11/1956 | Edmiston | 143—133 |

WILLIAM W. DYER, Jr., *Primary Examiner.*

HARRISON L. HINSON, *Examiner.*